United States Patent Office
2,833,794
Patented May 6, 1958

2,833,794

3-OXYGENATED 4-ANDROSTENE-1,17-DIOLS AND DERIVATIVES

Arthur H. Goldkamp, Deerfield, and Raymond M. Dodson, Park Ridge, Ill., assignors to G. D. Searle & Co., Chicago, Ill., a corporation of Delaware No Drawing. Application December 18, 1957
Serial No. 703,487

13 Claims. (Cl. 260—397.4)

The present invention relates to 3-oxygenated 4-androstene-1,17-diols and derivatives thereof. The compounds of this invention can be represented by the general structural formula

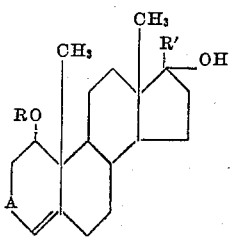

wherein A is a member of the class consisting of the hydroxymethylene and carbonyl groups, R is a member of the class consisting of hydrogen and (lower alkyl) CO-radicals, and R' is a member of the class consisting of hydrogen, lower alkyl, lower alkenyl, and lower alkynyl radicals.

In the above formula, the lower alkyl radicals include methyl, ethyl, and straight- and branch-chain propyl, butyl, pentyl, and hexyl. The lower alkenyl and alkynyl radicals include, illustratively, ethynyl, methylethynyl, vinyl, allyl, and higher homologs and isomers thereof.

1α,3-dihydroxy-5-androsten-17-one (1α-hydroxy-dehydroisoandrosterone), an important intermediate in this invention, can be obtained by subjecting dehydroisoandrosterone, under controlled conditions, to the oxygenating activity of a particular Penicillium organism isolated from a sample of Illinois soil. A culture of this microorganism has been deposited with the American Type Culture Collection, Washington, D. C., and has been designated as Penicillium sp., accession No. 12,556. This organism is sometimes referred to hereinafter as ATCC 12,556.

In the manufacture of 1α,3-dihydroxy-5-androsten-17-one, the selected strain of organism is cultured on a medium favorable to its propagation. Synthetic or partially synthetic liquid media are generally preferred, as such liquid media afford certain advantages. Incorporation of available carbon, nitrogen, minerals and accessory nutrient factors is facilitated by the use of a liquid medium. Use of a liquid culture medium affords additional advantages in permitting efficient aeration, intimate contact of the steroid substrate with the oxygenating enzymes of the fungus and conveniences in the isolation of the final product. Such a culture medium can incorporate a carbohydrate as a source of available carbon, and proteins, hydrolysis products of proteins, or inorganic nitrates or ammonium salts as a source of available nitrogen. Additional nutrient factors can be supplied by the incorporation of corn steep liquor into the medium. Mineral constituents and other accessory growth factors recognized in the prior art as being necessary or desirable for the growth of fungi are usually naturally present in the culture media described hereinafter. When synthetic media are employed which are deficient in minerals and other accessory growth factors, such constituents are added as required.

The sterilized culture medium is inoculated with Penicillium sp., ATCC 12,556, and growth of the organism is allowed to proceed under aerobic conditions at a suitable temperature. Temperatures within the range of 20–30° C. have been found desirable for the propagation of Penicillium fungi although appreciable growth also takes place outside of these limits. Aeration of the liquid culture medium is conveniently accomplished by agitation such as is achieved by stirring or by use of a shaking platform, by blowing air through the culture medium, or by a combination of these means.

The exact time and manner of introducing the steroidal substrate to the oxygenating activity of the Penicillium organism or enzymes is a relatively noncritical factor and these operating details can be selected from within fairly wide limits. For example, the steroid can be added to the culture medium prior to sterilization, at the time of inoculation of the medium with the fungus, or after the fungus has been allowed to grow for a period of time, conveniently up to 48 hours. The steroid to be oxygenated can be added to the culture medium as a solid, a suspension, or a solution. A desirably fine state of dispersion of the steroid is achieved by adding it to the fermentation medium as a solution in a small amount of ethanol or acetone. Oxygenation of the steroid can be achieved by subjecting it to the action of the entire culture, or alternatively, with the use of procedures known to the prior art, by subjecting it to the action of the separated oxygenating enzymes, free of nutritional factors which are needed for the growth of the fungus.

Satisfactory yields of oxygenated product are obtained by allowing a contact time of, typically, 8 to 48 hours, although substantial conversion begins almost immediately after the addition of the steroid to the fermentation mixture. The minimum period of time required for a satisfactory degree of conversion of the steroid depends on various factors such as the stage of growth of the fungus at the time of the addition of the steroid, the temperature of fermentation, and the rate of aeration. In general, extensive growth of the fungus before the addition of the steroid substrate tends to lessen the contact time required for satisfactory oxygenation of the steroid. A period of fungal growth of 24 hours, followed by a steroid contact time of 24 hours, has been found to give generally good results when the fermentation is conducted substantially as described herein. At the conclusion of the fermentation period, the steroidal product, which can contain unreacted dehydroisoandrosterone as well as steroidal transformation products, is recovered by such means as extraction with methylene chloride, and is subjected to purification or to separation into individual components by such means as crystallization from organic solvents or fractionation on a silica gel chromatography column.

The conversion of the 5-androsten-3-ols to 4-androsten-3-ones is accomplished by the use of another Penicillium organism. A culture of this microorganism has also been deposited with the American Type Culture Collection, Washington, D. C., and has been designated as Penicillium sp., accession No. 13,001. This organism is sometimes referred to hereinafter as ATCC 13,001. The incubation procedure is essentially the same as that described hereinabove.

Alternatively, 4-androsten-3-ones can be obtained by oxidation of 5-androsten-3-ols to 5-androsten-3-ones followed by treatment of the latter with a proton transfer agent such as oxalic acid.

17-alkynyl and 17-alkenyl derivatives encompassed within this invention can be prepared by the reaction of a 17-ketone with an organometallic reagent such as an alkynylmagnesium halide, alkynyl potassium, alkenylmagnesium halide, alkenyl lithium and the like. These products can then be reduced in the presence of a catalyst such as palladium.

17-alkyl derivatives can also be prepared from the 17-ketones by use of an organometallic reagent such as an alkyllithium or alkylmagnesium halide.

The compositions of the present invention have useful pharmaceutical applications, and specifically are androgenic and anabolic agents. A particular utility of compositions of this invention is that they inhibit the sodium retention caused by the mineralocorticoid hormone aldosterone. While they thus decrease sodium retention they do not affect the urinary potassium level; therefore, they increase the sodium-potassium ratio in the urine.

This invention will appear more fully in the examples which follow. These examples are set forth by way of illustration only, and it will be understood that the invention is not to be construed as limited in spirit or in scope by the details contained herein, as many modifications in materials and methods will be apparent from this disclosure to those skilled in the art. In these examples, temperatures are given in degrees centigrade (° C.) and quantities of materials, except as otherwise noted, in parts by weight.

*Example 1*

To a solution of 2 parts of sodium borohydride in 5 parts of water and 8 parts of ethanol maintained at about −20 to −10° C. is added in small portions a solution of 0.69 part of 1α-hydroxy-4-androstene-3,17-dione in 8 parts of ethanol. After a total reaction period of about 20 minutes, the reaction mixture is poured into 500 parts of water and acidified with glacial acetic acid. The solution is extracted with chloroform. The chloroform extract is dried and evaporated under vacuum. This affords a mixture of 4-androstene-1α,3α,17β-triol and 4-androstene-1α,3β,17β-triol. An infrared spectrum of the mixture shows bands at 3.0, 6.01, 9.51, 9.88, 11.6, 11.83 and 12.0 microns. Partial separation of these isomers can be effected by recrystallization from chloroform or from an acetone-ether solution.

*Example 2*

To a solution of 2.8 parts of 4-androstene-1α,3,17β-triol in 1500 parts of chloroform are added 20 parts of manganese dioxide. The mixture is stirred at about 25° C. for 6 hours, filtered, and the solvent removed. The residue is recrystallized from an acetone-ether solution to give 1α,17β-dihydroxy-4-androsten-3-one (1α-hydroxytestosterone), melting at 248–253° C. This compound shows a maximum ultraviolet absorption at 242 millimicrons with a molecular extinction coefficient of about 14,700. The infrared spectrum shows maxima at 2.94, 6.04, and 6.19 microns.

*Example 3*

A stainless steel fermentation tank having a capacity of about 40 liters is charged with a solution of 1000 grams of dextrose, 200 grams of a cottonseed protein concentrate, 90 milliliters of corn steep liquor and 12 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of about 110–115° C. and a final volume of about 30 liters. After cooling, an inoculation is made with a spore suspension of Penicillium sp., ATCC 12,556, and the contents of the fermentor are kept in agitation by a stirrer operating at about 200 revolutions per minute. A stream of air which has been sterilized by filtration through a glass wool filter is introduced through an inlet tube into the fermentor at a rate of about 10 liters per minute. This rate of aeration is measured by means of a rotameter placed in the sterile portion of the air line. Growth of the organism is allowed to continue for 24 hours at about 25° C., during which time additional small quantities of anti-foaming agent are added if required. At this point about 20 liters of the culture is conducted by means of a sterile hose connection into a second stainless steel fermentation tank, which has a capacity of about 400 liters and which has previously been charged with about 255 liters of a sterilized and cooled aqueous solution of 1200 milliliters of corn steep liquor and 408 grams of monobasic potassium phosphate, $KH_2PO_4$. The contents of this fermentor are kept agitated by a stirrer operating at about 150 revolutions per minute and by the introduction of a stream of sterile air at a rate of about 30 liters per minute. Growth of the organism is allowed to proceed in this fermentor for an additional 24 hours, after which time there is added a solution of 75 grams of dehydroisoandrosterone in 1500 milliliters of acetone. Fermentation in the presence of the steroid substrate is continued for an additional 20 hours at 25° C., with the same rates of stirring and aeration. Diatomaceous earth is then added, and the mycelium is separated by centrifugation. The mycelium is stirred with 18 liters of methylene chloride, and the aqueous broth collected in the centrifugation of the mycelium is extracted with a total of 200 liters of methylene chloride in two equal portions. The combined methylene chloride solutions are concentrated by distillation under reduced pressure to a suspension having a small volume, and the suspension is then evaporated to dryness. The non-volatile residue is extracted with 200 milliliters of boiling ether. Following this operation, which serves to remove certain ether-soluble impurities, a solid or semi-solid product amounting to about 25 grams is collected on a filter. Upon crystallization of this crude product from a mixture of pyridine and ether and then from aqueous pyridine there is obtained purified 1α,3β-dihydroxy-5-androsten-17-one (1α-hydroxy-dehydroisoandrosterone) which melts at about 275–277° C. after prior softening and has a specific rotation of about +10.6° in chloroform solution.

The combined crystallization liquors are concentrated to dryness, and a benzene solution of the non-volatile residue is applied to a silica gel chromatography column containing a quantity of silica equal to 80 times the weight of the crystallization liquor residues. By elution of the column with mixtures of benzene and ethyl acetate containing gradually increasing proportions of ethyl acetate, there are obtained an additional quantity of 1α,3β-dihydroxy-5-androsten-17-one. The compound is obtained at a satisfactory rate by elution with a 50–70 volume percent solution of ethyl acetate in benzene.

To a refluxing solution of 1.25 parts of 1α,3β-dihydroxy-5-androsten-17-one in 90 parts of tetrahydrofuran there is added a solution of 2 parts of lithium aluminum hydride in 45 parts of tetrahydrofuran over a period of about 15 minutes. The reaction mixture is heated under reflux for an additional 20 minutes, after which it is cooled and treated in succession with 30 parts of ethyl acetate, 12 parts of ethanol and 10 parts of water. The mixture is then diluted with ether, and washed with two portions of 10% sodium hydroxide solution and with water. The separated organic phase is dried over anhydrous sodium sulfate, filtered, and concentrated to dryness by vaporization of the solvents. The non-volatile residue is crystallized from a mixture of acetone and benzene to afford purified 5-androstene-1α,3β,17β-triol which, after thorough drying, melts at about 213–215° C. and has a specific rotation of about −54.8° in chloroform solution.

To a solution of 4 parts of 1α,3β,17β-trihydroxy-5-androstene in 15 parts of pyridine are added 16.5 parts of acetic anhydride. The mixture is heated on the steam bath for 3 hours and then diluted with about 100 parts of water to give 1α,3β,17β-triacetoxy-5-androstene. The compound is recrystallized from an ether petroleum-ether solution. It has a melting point of about 179–181° C. and a specific rotation in chloroform of about −34°.

To a solution of 1.5 parts of 1α,3β,17β-triacetoxy-5-androstene in 16 parts of methanol are added 0.4 part of anhydrous potassium bicarbonate. The mixture is maintained at reflux temperature for about 20 minutes, diluted with about 55 parts of water and extracted with dichloromethane. The extract is then dried and the solvent is removed. The residue is applied to a chromatographic column containing silica gel and eluted with benzene and benzene containing increasing amounts of ether. In this manner there is obtained 1α,17β-diacetoxy-5-adrosten-3β-ol which can be further purified by recrystallization from an ether petroleum-ether solution. The compound has a melting point of about 195–196.5° C. and infrared maxima at about 2.82, 5.77, and 7.95 microns. It has a specific rotation in chloroform solution of about −26°.

To a stirred solution of 0.25 part of 1α,17β-diacetoxy-5-androsten-3β-ol and 4 parts of acetone maintained at 25° C. are slowly added 0.22 part of a solution consisting of 27 parts of chromium trioxide and 41.5 parts of concentrated sulfuric acid diluted to 100 parts with water. After the addition, stirring is continued for another 2 or 3 minutes. The reaction mixture is then poured into about 45 parts of water and the resulting precipitate is collected on a filter. The compound melts at about 159–168° C. and is mainly 1α,17β-diacetoxy-5-androsten-3-one.

Treatment of 50 parts of the above ketone with 15 parts of oxalic acid in 4000 parts of methanol and 1000 parts of water for 30 minutes on a steam bath yields after dilution with about 4000 parts of water, 1α,17β-diacetoxy-4-androsten-3-one. The compound is recrystallized from a methylene chloride-ether solution. It has a melting point of about 187–189° C., and shows a maximum absorption in the ultraviolet at 240 millimicrons with a molecular extinction coefficient of about 14,700. The infrared spectrum shows maxima at about 5.75, 5.94, 6.15 and 8.0 microns.

*Example 4*

To 1 part of 1α,17β-dihydroxy-4-androsten-3-one are added 120 parts of pyridine and 80 parts of acetic anhydride. After standing at room temperature for 24 hours, the homogeneous reaction mixture is blown down with nitrogen to a small volume (5–10 parts) of residual solution. This is diluted with water and the resulting precipitate is collected by centrifugation. Recrystallization from a methanol-water solution gives 1α,17β-diacetoxy-4-androsten-3-one, identical with the product of Example 3. Substitution of an equimolar amount of propionic anhydride for acetic anhydride in the foregoing procedure yields 1α,17β-dipropionoxy-4-androsten-3-one.

*Example 5*

Sixty parts of potassium hydroxide are dissolved in 300 parts of diethylene glycol dimethylether and 16.5 parts of diethylene glycol monoethylether at 135–145° C. under nitrogen. This solution is then cooled with stirring to −5° C. in an ice water-ethanol bath to give a slurry.

After the solution has been saturated with acetylene, 10 parts of 1α,3β-dihydroxy-5-androsten-17-one are added. Stirring is continued for 4 hours while passing acetylene slowly over the mixture. The reaction mixture is then diluted with approximately 2 liters of water, acidified with hydrochloric acid and extracted with chloroform. The chloroform extract is dried and the solvents are removed by vacuum distillation. The residue is dissolved in benzene and applied to a chromatography column containing silica gel. The column is developed with benzene solutions containing increasing amounts of ethyl acetate. The desired product is eluted with a 1:1 ethyl acetate-benzene solution. Upon recrystallization from an acetone-ether solution there is obtained 17-ethynyl-5-androstene-1α,3β,17β-triol. The material melts at about 210–216° C. and has a specific rotation in chloroform solution of about −125°.

*Example 6*

To a solution of 2 parts of 17α-ethynyl-5-androstene-1α,3β,17-triol in 15 parts of pyridine are added 11 parts of acetic anhydride. After standing at room temperature for 24 hours, the reaction mixture is diluted with approximately 140 parts of water and extracted with chloroform. The chloroform extract is dried, the solvent vacuum distilled and the residue recrystallized from dichloromethane and ether solution to give 1α,3β-diacetoxy-17α-ethynyl-5-androsten-17-ol, melting at about 214.5–217.5° C. The infrared spectrum of this compound shows maxima at approximately 2.89, 3.08, 5.75, 7.90, and 8.05 microns.

To a solution of 1.5 parts of 1α,3β-diacetoxy-17α-ethynyl-5-androsten-17-ol in 16 parts of methanol are added 0.4 part of anhydrous potassium bicarbonate. The mixture is maintained at reflux temperature for 20 minutes, diluted with about 60 parts of water and extracted with dichloromethane. The dichloromethane extract is then dried and the solvent is removed. The residue is dissolved in benzene and chromatographed over a column containing silica gel. The column is developed with benzene and benzene solutions containing increasing amounts of ether. In this manner there is obtained 1α-acetoxy-17α-ethynyl-5-androstene-3β,17-diol. Upon recrystallization from an ether-petroleum ether solution, the compound shows infrared maxima at approximately 2.9, 3.08, 5.75, and 8.0 microns.

*Example 7*

5 parts of 1α-acetoxy-17α-ethynyl-5-androstene-3β,17-diol in 4 parts of acetone at 25° C. are oxidized by the method of the semi-final paragraph of Example 3. In this manner there is obtained 1α-acetoxy-17β-hydroxy-17-ethynyl-5-androsten-3-one.

Treatment of 50 parts of the above ketone with 15 parts of oxalic acid and 4000 parts of methanol and 1000 parts of water for 30 minutes on a steam bath yields, after dilution with about 4000 parts of water, 1α-acetoxy-17β-hydroxy-17-ethynyl-4-androsten-3-one. The compound can be recrystallized from a dichloromethane-ether solution. The final product shows infrared maxima at about 2.9, 3.05, 5.75, 5.98, 6.15 and 8.0 microns. It has an ultraviolet absorption maximum at about 240 millimicrons with a molecular extinction coefficient of approximately 14,700.

*Example 8*

A mixture of 10 parts of 1α-acetoxy-17β-hydroxy-17-ethynyl-4-androsten-3-one, 2.5 parts of 5% palladium-on-charcoal catalyst and 50 parts of dioxane is shaken in contact with a hydrogen atmosphere until 2 molecular equivalent of hydrogen have been consumed. The catalyst is removed by filtration, and the residue remaining after concentration of the filtrate is purified by recrystallization from a mixture of ether and petroleum ether. In this manner there is obtained 1α-acetoxy-17-hydroxy-17-ethyl-4-androsten-3-one.

*Example 9*

To a solution of 19 parts of 1α-acetoxy-17-hydroxy-17α-ethyl-4-androsten-3-one in 400 parts of methanol and 50 parts of ethyl acetate is added a solution of 10 parts of sodium borohydride in 200 parts of methanol. The mixture is maintained at room temperature for an hour and treated first with 30 parts of water and then with a sufficient amount of acetic acid to lower the pH to 6.0.

The reaction mixture is concentrated on a steam bath with a current of nitrogen to about 50 parts. After dilution with 600 parts of water the precipitate is collected on a filter and washed with water. The residue is dissolved in benzene and applied to a chromatography column containing silica gel. The column is washed with benzene and then with a benzene solution containing 10% ethyl acetate. Subsequent washings are with a 20% solution of ethyl acetate in benzene and a 25% solution of ethyl acetate in benzene. A satisfactory rate of elution for the product is obtained with a solution of about 30% ethyl acetate in benzene. This yields 1α-acetoxy-17-ethyl-4-androsten-3β,17β-diol. Upon concentration of the eluate the product is obtained in fine, prismatic needles.

*Example 10*

To a refluxing suspension of 6.5 parts of 1α,3β-dihydroxy-5-androsten-17-one in 450 parts of tetrahydrofuran is added a 3-molar solution of methylmagnesium bromide in butyl ether containing a total of about 36 parts of methylmagnesium bromide. The addition is carried out over a period of about 10 minutes, after which refluxing is continued for an additional 2½ hours. Excess methylmagnesium bromide is decomposed by the addition of water to the cooled reaction mixture. The mixture is then chilled and partitioned between ether and an excess of saturated ammonium chloride solution. The separated ethereal phase is washed twice with saturated ammonium chloride solution and twice with water, after which it is rendered anhydrous, filtered, and concentrated by vaporization of the solvents under reduced pressure until there remains a residue comprising a solid product and a trace or small amount of butyl ether. Upon either chromatography on a silica gel column or fractional crystallization, this residue affords a quantity of unreacted 1α,3β-dihydroxy-5-androsten-17-one and a quantity of the desired product. The product is recrystallized from a mixture of acetone and ether to yield 17-methyl-5-androstene-1α,3β,17β-triol melting at about 197.5–198° C. This compound is subjected to the fermentation procedure of Example 3, except that the fermentation is carried out with Penicillium sp., ATTC 13,001 to yield 1α,17-dihydroxy-17α-methyl-4-androsten-3-one in white prismatic crystals. The compound shows infrared maxima at 2.88, 6.01 (strong), and 6.16 (weak) microns.

To a solution of 16 parts of 1α,17β-dihydroxy-17-methyl-4-androsten-3-one in 400 parts of methanol and 50 parts of ethyl acetate is added a solution of 10 parts of sodium borohydride in 100 parts of methanol. The mixture is maintained at room temperature for an hour and treated first with 30 parts of water and then a sufficient amount of acetic acid to lower the pH to 6.0. The reaction mixture is concentrated on a steam bath with a current of nitrogen to about 50 parts. After dilution with about 600 parts of water the precipitate is collected on a filter and washed with water. The residue is applied in a 10% solution of ethyl acetate in benzene to a chromatography column containing 760 parts of silica gel. The column is eluted with benzene containing increasing amounts of ethyl acetate. Elution with a 60–70% solution of ethyl acetate in benzene and repeated recrystallization of the residue from a mixture of ethyl acetate and cyclohexane yields 17-methyl-4-androstene-1α,3,17β-triol in colorless needles. Infrared maxima are observed at 2.96 and 6.01 (weak) microns.

Substitution of an equimolar amount of ethylmagnesium bromide for methylmagnesium bromide in the foregoing procedure yields 17-ethyl-4-androstene-1α,3,17β-triol.

*Example 11*

A mixture of 20 parts of 1α-acetoxy-17β-hydroxy-17-ethynyl-4-androsten-3-one, 5 parts of 5% palladium-on-calcium carbonate catalyst and 100 parts of dioxane is shaken in contact with a hydrogen atmosphere until approximately 1 molecular equivalent of hydrogen has been consumed. The catalyst is removed by filtration, and the residue remaining after concentration of the filtrate is purified by recrystallization from a mixture of ether and petroleum ether. In this manner there is obtained 1α-acetoxy-17β-hydroxy-17-vinyl-4-androsten-3-one with infrared maxima at 2.87, 5.75, 5.95, and 6.15 microns.

What is claimed is:

1. A compound of the structural formula

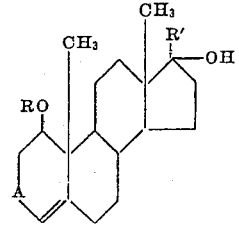

wherein A is a member of the class consisting of the hydroxymethylene and carbonyl groups, R is a member of the class consisting of hydrogen and (lower alkyl) CO- radicals, and R' is a member of the class consisting of hydrogen, lower alkyl, ethynyl, and vinyl radicals.

2. 4-androstene-1α,3,17β-triol.
3. 1α,17β-dihydroxy-4-androsten-3-one.
4. A compound of the structural formula

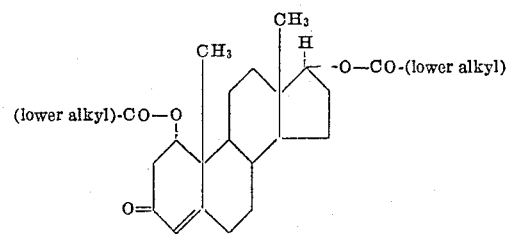

5. 1α-acetoxy-17-hydroxy-17α-ethynyl-4-androsten-3-one.
6. 1α-acetoxy-17-hydroxy-17α-vinyl-4-androsten-one.
7. A compound of the structural formula

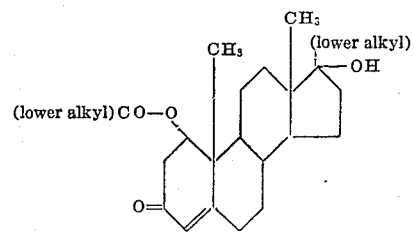

8. A compound of the structural formula

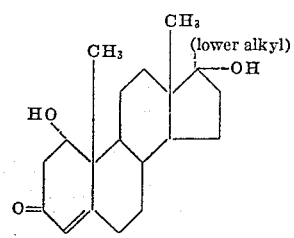

9. 1α,17-dihydroxy-17α-methyl-4-androsten-3-one.

10. A compound of the structural formula
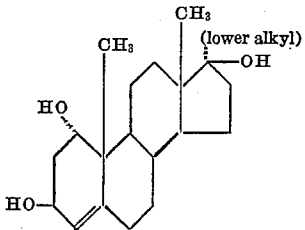
11. 17α-methyl-4-androsten-1α,3,17-triol.
12. A compound of the structural formula
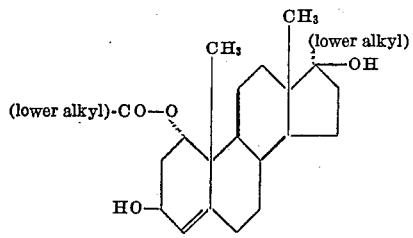
13. 1α - acetoxy - 17 - hydroxy - 17α - ethyl - 4 - androsten-3-one.
References Cited in the file of this patent
UNITED STATES PATENTS
| | | |
|---|---|---|
| 2,660,586 | Murray et al. | Nov. 24, 1953 |
| 2,805,231 | Dodson et al. | Sept. 3, 1957 |

UNITED STATES PATENT OFFICE
Certificate of Correction

Patent No. 2,833,794                                                 May 6, 1958

Arthur H. Goldkamp et al.

It is hereby certified that error appears in the printed specification of the above numbered patent requiring correction and that the said Letters Patent should read as corrected below.

Column 6, line 61, for "equivalent" read *equivalents*; column 8, claim 1, lower left-hand portion of the formula, for

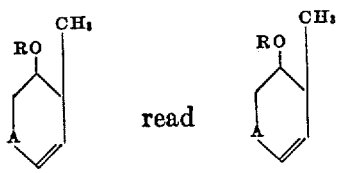

column 8, claim 4, right-hand portion of the formula, for

same column 8, claim 6, lines 46 and 47, for "-androsten-one." read *-androsten-3-one.*; column 8, claim 8, right-hand portion of the formula, for

Signed and sealed this 13th day of January 1959.

[SEAL]

Attest:
KARL H. AXLINE,
*Attesting Officer.*

ROBERT C. WATSON,
*Commissioner of Patents.*